United States Patent
Fatemi et al.

(10) Patent No.: US 11,056,991 B2
(45) Date of Patent: Jul. 6, 2021

(54) METHOD AND APPARATUS FOR CONTROLLING OPERATION OF A ROTARY ELECTRIC MACHINE

(71) Applicant: GM GLOBAL TECHNOLOGY OPERATIONS LLC, Detroit, MI (US)

(72) Inventors: Alireza Fatemi, Canton, MI (US); Thomas W. Nehl, Shelby Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 89 days.

(21) Appl. No.: 16/691,925

(22) Filed: Nov. 22, 2019

(65) Prior Publication Data
US 2021/0159826 A1   May 27, 2021

(51) Int. Cl.
H02P 21/00 (2016.01)
H02P 23/00 (2016.01)

(52) U.S. Cl.
CPC ...... H02P 21/0003 (2013.01); H02P 23/0004 (2013.01)

(58) Field of Classification Search
CPC .......................... H02P 21/0003; H02P 23/0004
USPC ........................................ 318/430, 432, 433
See application file for complete search history.

(56) References Cited

U.S. PATENT DOCUMENTS 8,415,909 B2 *   4/2013   Ramamurthy ............ H02P 5/00
                                                         318/434

\* cited by examiner

*Primary Examiner* — David Luo
(74) *Attorney, Agent, or Firm* — Quinn IP Law

(57) ABSTRACT

A method and system for controlling and regulating operation of a multi-phase rotary electric machine in a manner that minimizes power loss under partial load conditions is described. This includes an instruction set that is executable to determine a torque command and a rotational speed of the electric machine, determine a peak torque per loss parameter for the electric machine based upon the rotational speed, and determine a second torque parameter for the electric machine based upon the rotational speed. A modulated torque command for controlling the electric machine is determined based upon the peak torque per loss parameter and the second torque parameter, wherein the electric machine generates an average torque that is equivalent to the torque command when operating in response to the modulated torque command. The inverter is controlled to operate the electric machine based upon the modulated torque command.

19 Claims, 4 Drawing Sheets

METHOD AND APPARATUS FOR CONTROLLING OPERATION OF A ROTARY ELECTRIC MACHINE

INTRODUCTION

Drive-cycle losses associated with operation of rotary electric machines may be dominated by motor core losses under partial load conditions. There may be benefit to operational schemes that improve efficiency by reducing motor core losses under partial load conditions.

SUMMARY

A method and system for controlling and regulating operation of a multi-phase rotary electric machine in a manner that minimizes power loss under partial load conditions is described. This includes a control system for the multi-phase rotary electric machine that includes an inverter that is electrically connected to the electric machine, and a controller that is operatively coupled to the inverter and in communication with sensors that are disposed to monitor the electric machine. The controller includes an instruction set that is executable to determine a torque command and a rotational speed of the electric machine, determine a peak torque per loss parameter for the electric machine based upon the rotational speed of the electric machine, and determine a second torque parameter for the electric machine based upon the rotational speed of the electric machine. A modulated torque command for controlling the electric machine is determined based upon the peak torque per loss parameter and the second torque parameter, wherein the electric machine generates an average torque that is equivalent to the torque command when operating in response to the modulated torque command. The inverter is controlled to operate the electric machine based upon the modulated torque command.

An aspect of the disclosure includes the instruction set executable to determine a time constant associated with the electric machine, and control the inverter to operate the electric machine based upon the modulated torque command and the time constant.

Another aspect of the disclosure includes the instruction set executable to determine a control period for the electric machine based upon the time constant, and control the inverter to operate the electric machine based upon the modulated torque command and the control period.

Another aspect of the disclosure includes the instruction set executable to determine a first subperiod of the control period for controlling the electric machine at the peak torque per loss parameter and a second subperiod of the control period for controlling the electric machine at the second torque parameter, wherein the average torque generated by the electric machine over the control period is equivalent to the torque command. The inverter is controlled to operate the electric machine at the peak torque per loss parameter for the first subperiod and operate the electric machine at the second torque parameter for the second subperiod.

Another aspect of the disclosure includes the peak torque per loss parameter being a torque level associated with peak efficiency of the electric machine at the rotational speed of the electric machine.

Another aspect of the disclosure includes the second torque parameter being a magnitude of torque associated with a minimum power loss at the rotational speed of the electric machine.

Another aspect of the disclosure includes the second torque parameter for the electric machine being zero.

Another aspect of the disclosure includes the sensors disposed to monitor the electric machine being current, voltage and speed sensors.

Another aspect of the disclosure includes the instruction set being executable to repetitively control the inverter to operate the electric machine at the peak torque per loss parameter for the first subperiod and operate the electric machine at the second torque parameter for the second subperiod.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

One or more embodiments will now be described, by way of example, with reference to the accompanying drawings, in which:

FIG. 3-1 is a graphic illustration of efficiency in relation to torque output from an embodiment of an electric machine over a range of rotational speeds, in accordance with the disclosure.

FIG. 3-2 is a graphic illustration of efficiency in relation to torque output from an embodiment of an electric machine that is operating at a specific rotational speed, in accordance with the disclosure.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

As used herein, the term "system" refers to mechanical and electrical hardware, software, firmware, electronic control componentry, processing logic, and/or processor device, individually or in combination, including without limitation: application specific integrated circuit (ASIC), an electronic circuit, a processor (shared, dedicated, or group) that executes one or more software or firmware programs, memory device(s) that electrically store software or firmware instructions, a combinatorial logic circuit, and/or other components that provide the described functionality.

Figure 1:
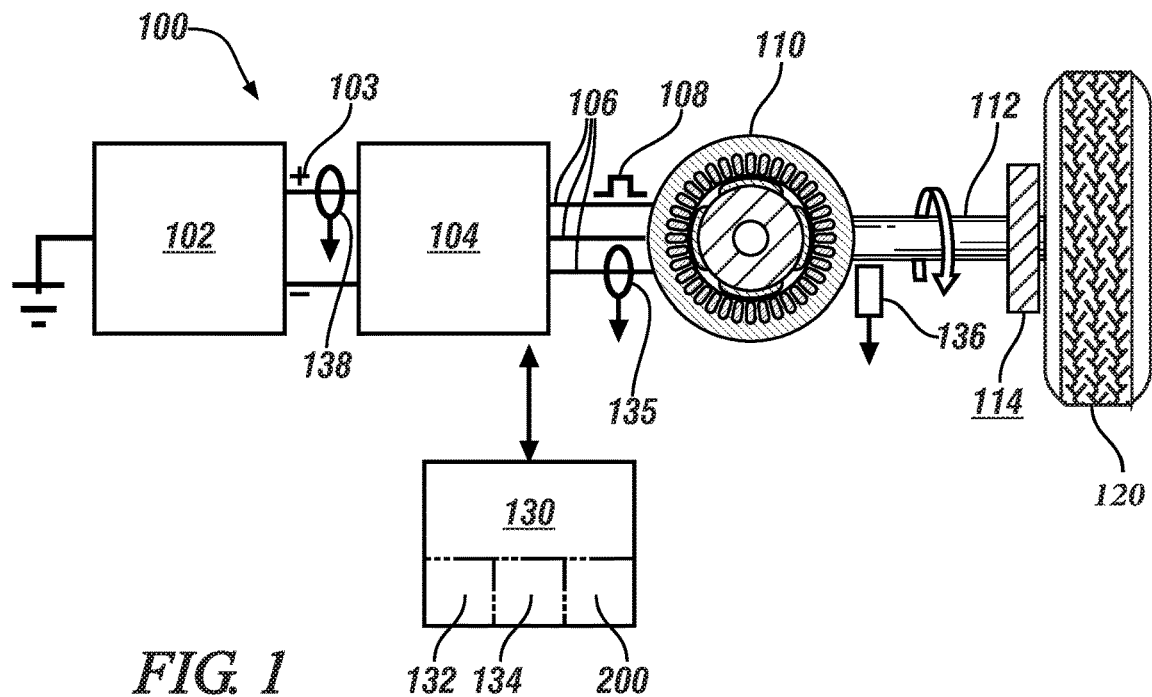
FIG. 1 is a schematic illustration of a system including a multi-phase rotary electric machine, a DC power source, an inverter, and a controller. The system is arranged to generate and transfer torque that may be transferred to an actuator, in accordance with the present disclosure.

Referring to the drawings, wherein like reference numbers refer to the same or like components in the several Figures, FIG. 1 schematically illustrates a system 100 that includes a multi-phase rotary electric machine ("electric machine") 110 that is arranged to generate and transfer torque to an actuator 120 to effect work, and a controller 130 that executes a control routine 200 to control and manage operation thereof. Details related to the control routine 200 are described with reference to FIG. 2. In one embodiment, the system 100 is disposed on a vehicle (not shown). When disposed on a vehicle, the vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The system 100 also includes an inverter 104 and a DC power source 102. The DC power source 102 connects to the inverter 104 via a high-voltage DC bus 103, and the inverter 104 connects to the electric machine 110 via a plurality of electrical power lines 106.

The electric machine 110 may be configured as a multi-phase permanent magnet electric machine, an inductive machine, or another motor configuration. The electric machine 110 may be characterized by an electrical time constant (L/R), which is the amount of time it takes the current in the winding to reach 63 percent of its maximum rated value. The electrical time constant is found by dividing inductance (L) by resistance (R).

The inverter 104 includes a plurality of semiconductor switches (not shown) that are arranged and controllable to transform DC electric power to AC electric power, and transform AC electric power to DC electric power, employing a pulse-width modulation signal 108 or another control technique. The inverter 104 operates at a high-speed control bandwidth. The inverter 104 is arranged and controllable to transform DC electric power originating from the DC power source 102 to AC electric power to actuate the electric machine 110 to rotate and generate mechanical torque that is transferred via a rotatable member 112 and a geartrain 114 to the actuator 120 when operating in a torque generating mode. The electric machine 110 is controllable to generate AC electric power from mechanical torque originating at the actuator 120, which is transformed by the inverter 104 to DC electric power for storage in the DC power source 102 when operating in an electric power generating mode. The actuator 120 includes, in one embodiment, a vehicle wheel that transfers torque to a ground surface to effect forward motion as part of a traction propulsion system. The DC power source 102 may be in the form of a rechargeable electrochemical battery device, a fuel cell, an ultracapacitor, and/or another battery technology.

Sensors are arranged to monitor parameters of the system 100. Monitored parameters include, by way of non-limiting examples, voltage and current between the electric machine 110 and the inverter 104, and rotational speed of the electric machine 110. Other monitored parameters may include, e.g., torque transferred to the hydraulic actuator 120, voltage at the high-voltage DC bus 103, etc. In one embodiment, the sensors may include a voltage sensor 138 that is arranged to monitor the high-voltage DC bus 103, one or a plurality of current sensors 135 that is arranged to monitor current flow between the inverter 104 and the electric machine 110, and a rotational speed sensor 136 that is arranged to monitor rotational speed of the rotatable member 112 of the electric machine 110. Other monitored parameters may include motor commands, including a motor torque command, which may originate from an operator torque request or a system request associated with the actuator 120.

The controller 130 may be embodied as one or more digital computing devices, and may include one or more processors 134 and sufficient amounts of tangible non-transitory memory 132. The control routine 200 may be stored as an executable instruction set in the memory 132 and executed by one of the processors 134 of the controller 130. The controller 130 is in communication with the inverter 104 and the aforementioned sensors to control operation thereof in response to execution of the control routine 200 to operate the electric machine 110.

The term "controller" and related terms such as microcontroller, control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The term "model" refers to a processor-based or processor-executable code and associated calibration that simulates a physical existence of a device or a physical process. As used herein, the terms "dynamic" and "dynamically" describe steps or processes that are executed in real-time and are characterized by monitoring or otherwise determining states of parameters and regularly or periodically updating the states of the parameters during execution of a routine or between iterations of execution of the routine.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

The terms "calibration", "calibrated", and related terms refer to a result or a process that compares an actual or standard measurement associated with a device or system with a perceived or observed measurement or a commanded position for the device or system. A calibration as described herein can be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
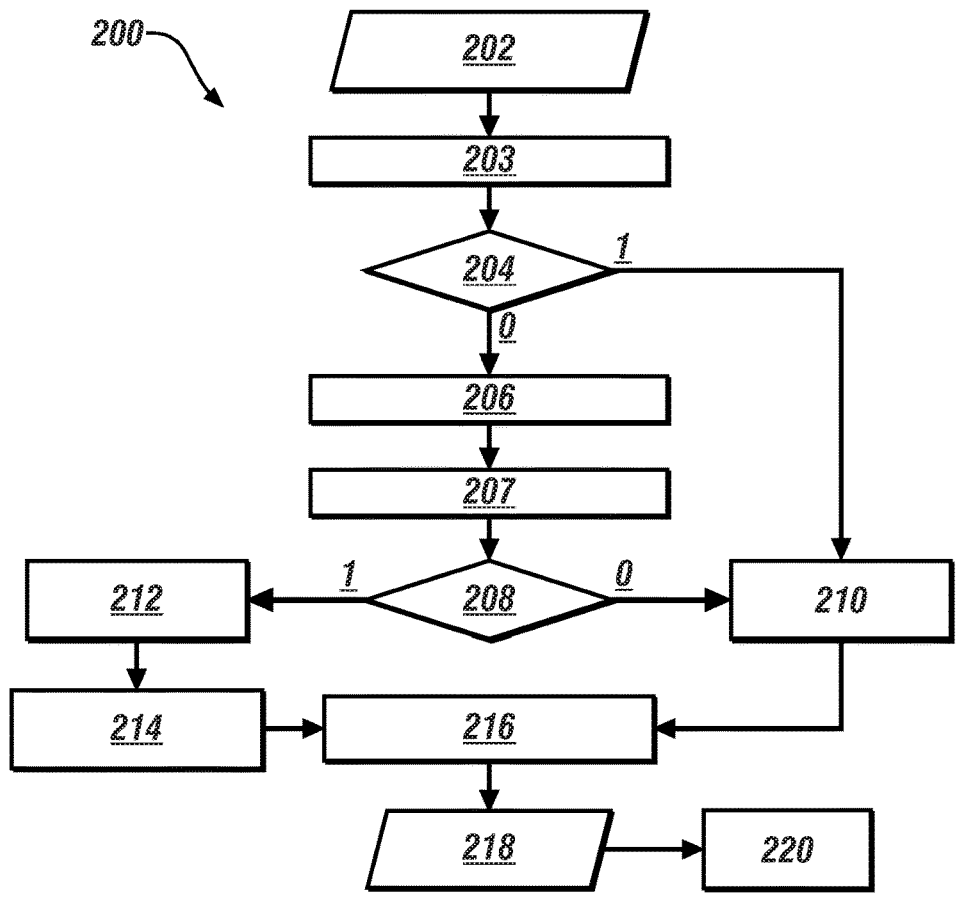
FIG. 2 is a schematic illustration of a control routine, in the form of a flowchart, for controlling operation of an embodiment of the system described with reference to FIG. 1, in accordance with the disclosure.

FIG. 2 schematically shows an embodiment of the control routine 200, which may be implemented as executable code to control operation on an electric machine, e.g., an embodiment of the electric machine 110 that is described with reference to FIG. 1. The control routine 200 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. Table 1 is provided as a key wherein the numerically labeled blocks and the corresponding functions are set forth as follows, corresponding to the control routine 200.

TABLE 1

| BLOCK | BLOCK CONTENTS |
|---|---|
| 202 | Determine $T_C$, N |
| 203 | Determine $T_{L1}$ and $T_{L2}$ based upon N |
| 204 | Is $T_C > T_{L1}$? |
| 206 | Determine $t_{L1}$, $t_{L2}$ based upon electrical time constant |
| 207 | Estimate energy losses for $E_{T,new}$ and $E_{TC}$ |
| 208 | Is $E_{T,new} > E_{TC}$? |
| 210 | Set $T_{out}$ = TC |
| 212 | Set $T_{out}$ = $T_{L1\&L2}$ |
| 214 | Determine quantity of level changes based upon the electrical time constant |
| 216 | Access flux lookup table |
| 218 | Determine idq |
| 220 | Control electric machine based upon idq |

Overall, the controller 130 monitors inputs from the sensors that are arranged to monitor parameters of the system, including the voltage sensor 138, the current sensor(s) 135, and the rotational speed sensor 136, and executes the control routine 200 in the form of an instruction set to control the inverter 104. This includes determining a torque command and a rotational speed of the electric machine 110, determining a peak torque per loss parameter for the electric machine 110 based upon the rotational speed, and determining a second torque parameter for the electric machine based upon the rotational speed. A modulated torque command is determined for controlling the electric machine 110 based upon the peak torque per loss parameter and the second torque parameter, wherein the electric machine 110 generates an average torque that is equivalent to the torque command when operating in response to the modulated torque command. The inverter 104 operates the electric machine 110 based upon the modulated torque command. Further details include as follows.

Execution of the control routine 200 may proceed as follows. The steps of the control routine 200 may be executed in order but are not limited to the order described with reference to FIG. 2. As employed herein, the term "1" indicates an answer in the affirmative, or "YES", and the term "0" indicates an answer in the negative, or "NO".

The control routine 200 may periodically execute, with each iteration starting by determining parameters including the rotational speed (N) and the torque command (TC) for the electric machine 110 (202). A peak torque per loss parameter ($T_{L1}$) for the electric machine 110 is determined based upon the rotational speed, and a second torque parameter ($T_{L2}$) is determined based upon the rotational speed. The peak torque per loss parameter ($T_{L1}$) and the second torque parameter ($T_{L2}$) provide the basis for a modulated torque command.

Figures 1, 3:
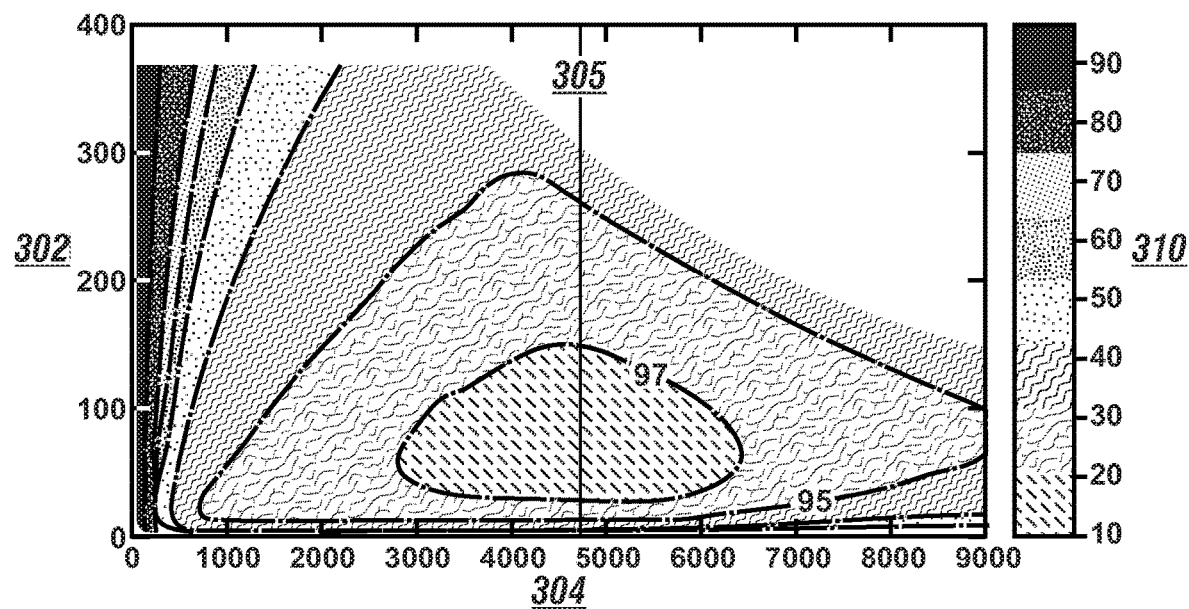
Figures 2, 3:
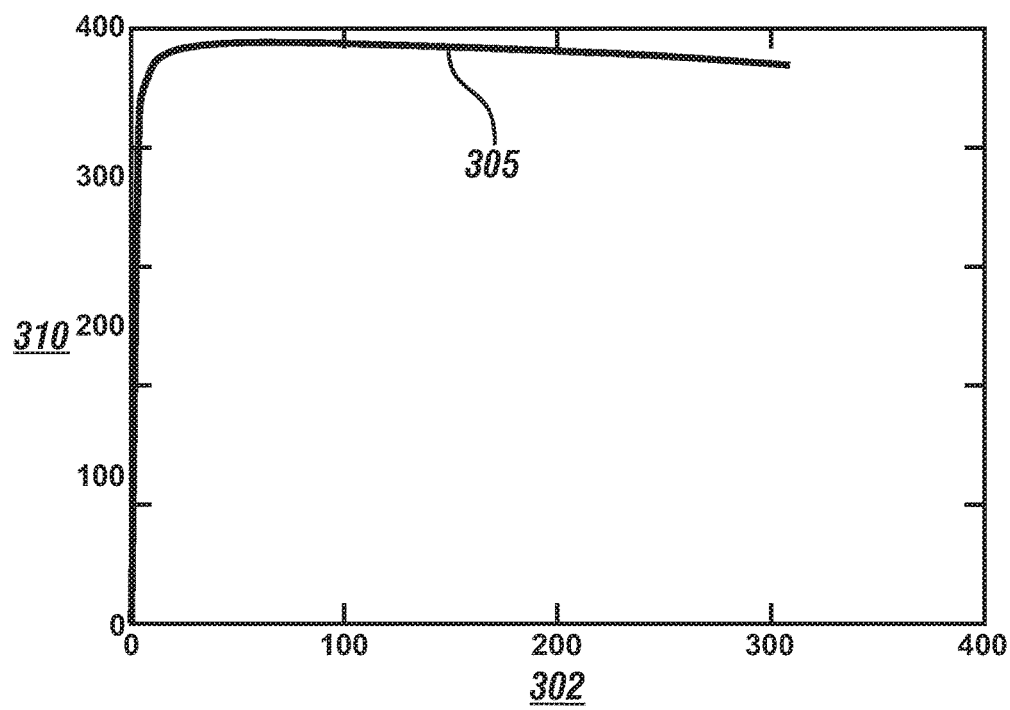

The peak torque per loss parameter ($T_{L1}$) for the electric machine 110 is a speed-specific parameter for the electric machine 110 that is based upon electrical efficiency of the electric machine 110. FIGS. 3-1 and 3-2 graphically show energy efficiency 310 in relation to torque output 302 on the vertical axis and rotational speed 304 on the horizontal axis, for an embodiment of the electric machine 110 described with reference to FIG. 1, wherein the magnitude of the energy efficiency 310 is indicated by a legend. The dashed lines depict iso-efficiency states. A single rotational speed value 305 is indicated by a vertical line. The energy efficiency in relation to torque output 302 and rotational speed 304 may be developed and determined during development of the embodiment of the electric machine 110. The energy efficiency in relation to torque output 302 and rotational speed 304 may be captured and stored as a calibration in the memory 132 of the controller 130 for future reference. The energy efficiency 310 associated with the single rotational speed value 305 is shown in relation to the torque output 302 for the electric machine 110 with reference to FIG. 3-2.

Drive-cycle losses of an electric machine are dominated by motor core losses at partial load operation. As illustrated by the data, for a given speed, as the torque level increases from a no-load state, the energy efficiency increases to a peak and then drops again at higher torque levels. This efficiency trend, coupled with a rapid torque response of the electric machine 110, may facilitate control that includes modulation of the dq axis current to reduce energy losses under partial load conditions.

Figure 4:
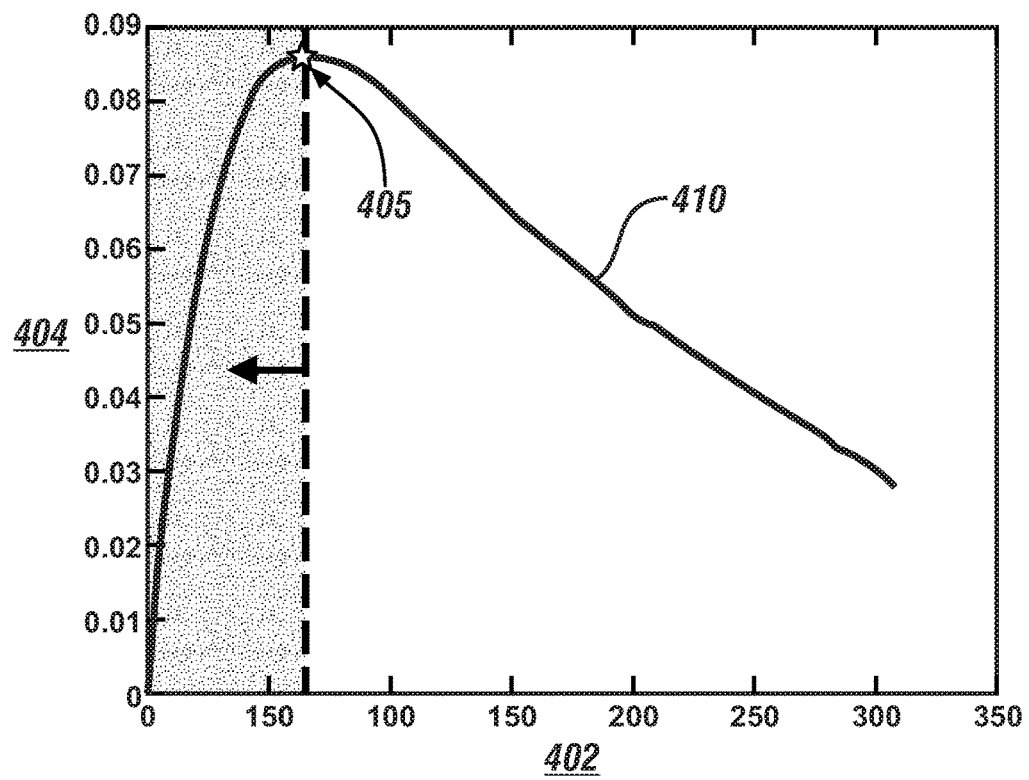
FIG. 4 is a graphic illustration of torque per loss parameters in relation to torque output from an embodiment of an electric machine that is operating at a specific rotational speed, in accordance with the disclosure.

FIG. 4 graphically illustrates a transformation of the relationship between energy efficiency and torque output at each operating speed of the electric machine 110, which results in a relationship 410 between a torque per loss parameter 404, shown on the vertical axis, in relation to the torque output 402 of the electric machine 110, which is shown on the horizontal axis. The torque per loss parameter 404 is an indication of torque efficiency in relation to the torque output 402 at a selected operating speed of the electric machine 110, and includes a peak torque per loss value 405. As shown, the electric machine 110 is capable of producing higher torque levels at the selected operating speed, but at a cost of reduced energy efficiency as compared to the energy efficiency at the peak torque per loss value 405. This analysis indicates that there may be efficiency benefits to control routines that focus on operating the electric machine 110 at its peak efficiency under partial load conditions, as indicated by the peak torque per loss value 405.

Figure 5:
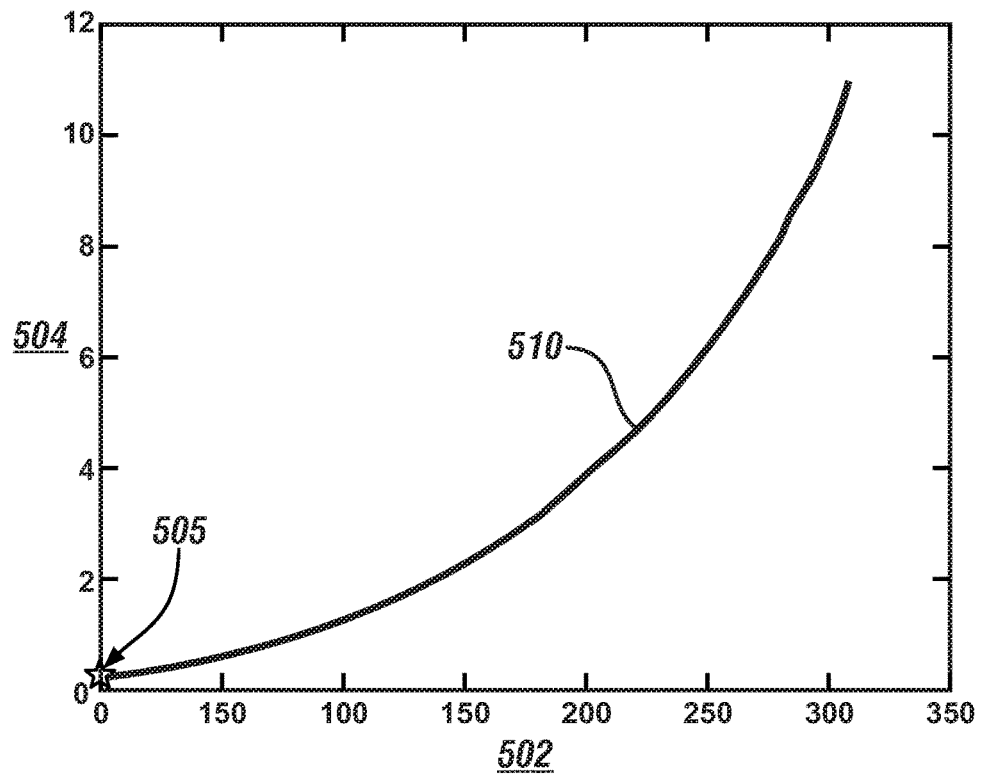
FIG. 5 is a graphic illustration of minimum power loss in relation to torque output from an embodiment of an electric machine that is operating at a specific rotational speed, in accordance with the disclosure.

The second torque parameter ($T_{L2}$) represents a torque output that is associated with a minimum torque loss at a selected operating speed of the electric machine 110. FIG. 5 graphically illustrates a relationship 510 between torque output 502, shown on the horizontal axis, and torque loss 504, shown on the vertical axis. A minimum torque loss 505 is shown, and indicates, in this instance, that a minimum torque loss is achieved at a minimum torque level.

Referring again to FIG. 2, the torque command (TC) for the electric machine 110 is compared to a threshold torque, which is the peak torque per loss parameter ($T_{L1}$) for the operating speed (204).

When the torque command (TC) for the electric machine 110 is greater than the peak torque per loss parameter ($T_{L1}$) (204)(1), the electric machine 110 is operated such that the output torque is set equal to the commanded torque ($T_{out}=T_C$) (210), and operation continues as described herein at step 216.

When the torque command (TC) for the electric machine 110 is less than or equal to the peak torque per loss parameter ($T_{L1}$) for the operating speed (204)(0), a cycle time period t is determined based upon the electrical time constant for the embodiment of the electric machine 110, and first and second subperiods $t_{L1}$ and $t_{L2}$, respectively, are determined (206) in accordance with the following equation:

$$T_{avg}=T_{L1}*t_{L1}/t+T_{L2}*t_{L2}/t \quad [1]$$

wherein:

$T_{avg}$ represents an average torque level generated during the time period t.

Figure 6:
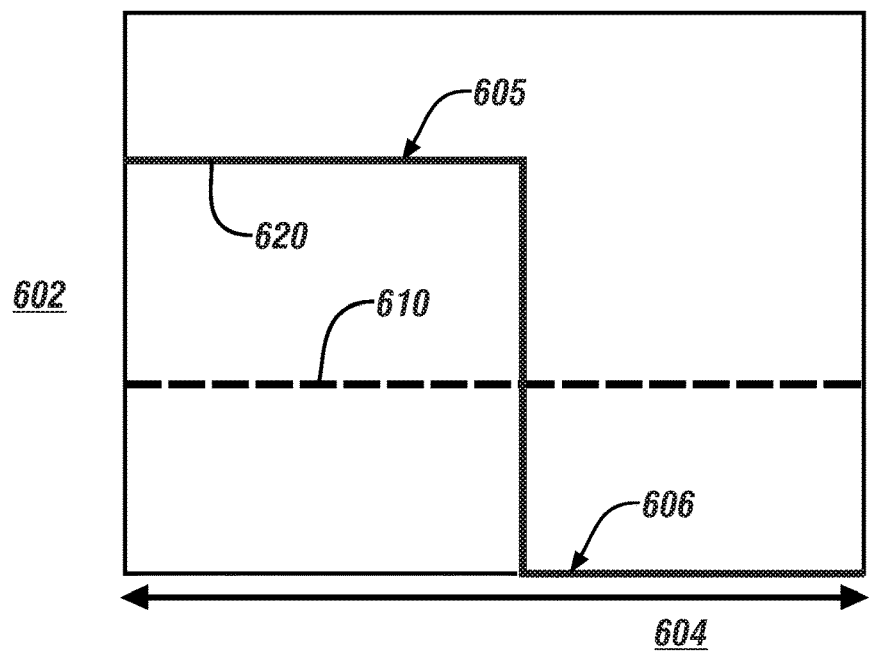
FIG. 6 is a graphic illustration of an example of average torque and a corresponding modulated torque including a peak torque per loss parameter and a second torque parameter for a single cycle time period, in accordance with the disclosure.

The average torque level generated during the time period t is set equal to the torque command (TC) for purposes of calculating the first and second subperiods $t_{L1}$ and $t_{L2}$. FIG. 6 graphically illustrates an example of average torque 610 and a corresponding modulated torque 620 including a peak torque per loss parameter (TO 605 and a second torque parameter ($T_{L2}$) 606 for a single cycle time period t that is separated into first and second subperiods $t_{L1}$ and $t_{L2}$ 605, 606, respectively, wherein torque 602 is indicated on the vertical axis and time 604 is indicated on the horizontal axis. The average torque 610 is equivalent to a corresponding modulated torque 620, which may be calculated in accordance with the relationship described in Eq. 1.

Energy losses are determined for both operating conditions (207). This includes determining a first energy loss term $E_{TC}$, which is determined as the magnitude of energy loss associated operating the electric machine with the average torque $T_{avg}$ being set equal to the commanded torque Tc. This also includes determining a second energy loss term $E_{T,new}$, which is determined as the magnitude of energy loss associated operating the electric machine at the peak torque per loss parameter ($T_{L1}$) and the second torque parameter ($T_{L2}$) during first and second subperiods $t_{L1}$ and $t_{L2}$, respectively, that are successively executed.

When the first energy loss term $E_{TC}$ is less than the second energy loss term $E_{T,new}$ (208)(0), the electric machine 110 is operated such that the output torque is set equal to the commanded torque ($T_{out}=T_C$) (210), and operation continues as described herein at step 216.

When the first energy loss term $E_{TC}$ is greater than or equal to the second energy loss term $E_{T,new}$ (208)(1), the output torque $T_{out}$ is set equal to the combined peak torque per loss parameter ($T_{L1}$) and the second torque parameter ($T_{L2}$) during first and second subperiods $t_{L1}$ and $t_{L2}$, respectively, that are successively executed (212). A desired cycle rate is set based upon the electrical time constant for the embodiment of the electric machine (214).

The output torque $T_{out}$ is input to a control routine to determine flux commands (216), and translated to d-axis and q-axis currents (218), and the modulated dq-current is communicated to the inverter 104 to control the electric machine 110 based thereon (220). As such, the controller 130 determines the first subperiod $t_{L1}$ of the control period t for controlling the electric machine 110 at the peak torque per loss parameter and the second subperiod $t_{L2}$ of the control period t for controlling the electric machine 110 at the second torque parameter, wherein the average torque generated by the electric machine over the control period is equivalent to the torque command, and controls the inverter 104 to operate the electric machine 110 in response.

Figure 7:
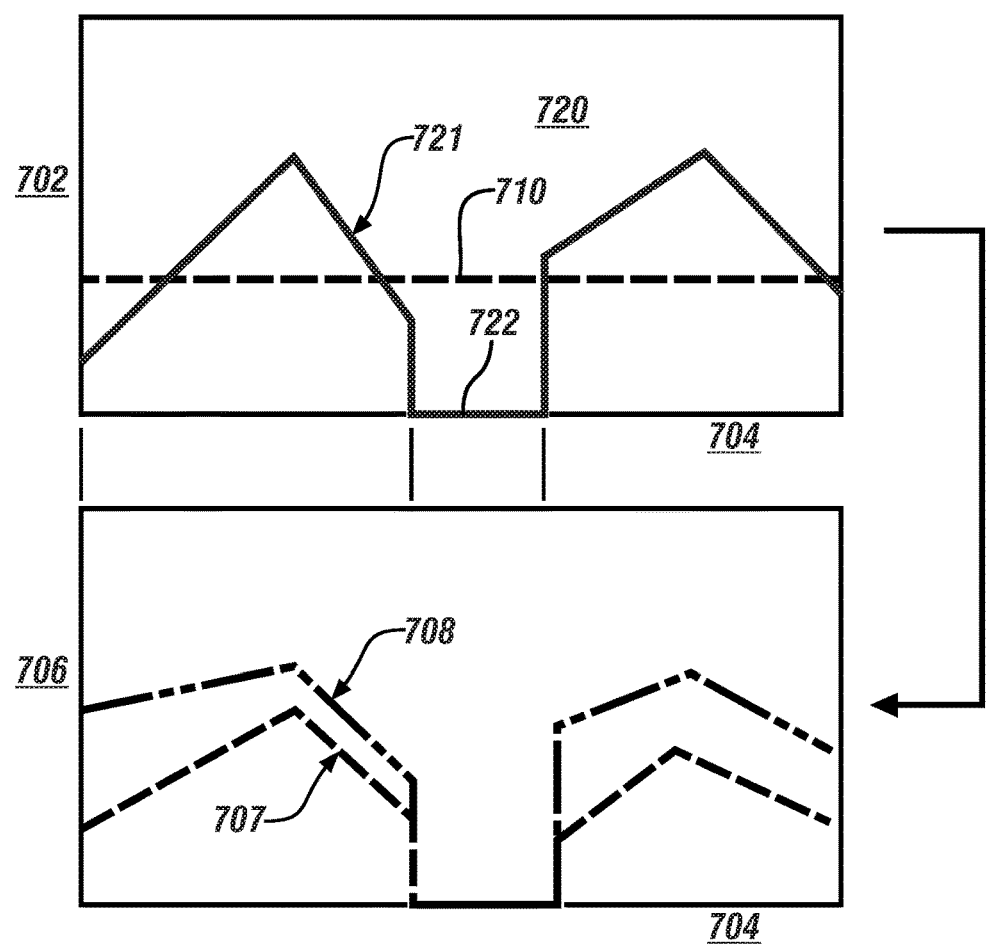
FIG. 7 is a graphic illustration of an average torque command and a corresponding modulated torque command in relation to time, and corresponding dq-axis currents, in accordance with the disclosure.

FIG. 7 graphically shows one embodiment of an average torque command 710 and a corresponding modulated torque command 720 in relation to time 704, wherein torque 702 is indicated on the vertical axis and time 704 is indicated on the horizontal axis. The modulated torque command 720 includes a first torque command 721 that is associated with the peak torque per loss parameter ($T_{L1}$) and a second torque command 722 that is associated with the second torque parameter ($T_{L2}$) during first and second subperiods $t_{L1}$ and $t_{L2}$, respectively. Thus, based upon the torque command and the energy losses, the modulated torque command can be generated that has the same average torque over the course of the control period t, but with lower energy losses when compared operation at the average torque. The modulated torque command for controlling the electric machine is determined based upon the peak torque per loss parameter and the second torque parameter. The modulated torque command includes a torque profile that is determined based upon the peak torque per loss parameter and the second torque parameter that is selected to minimize system energy losses and generate an average torque that is equivalent to the torque command. The modulated torque command may be a simple pulsewidth-modulated command that executes a single cycle based upon the peak torque per loss parameter and the second torque parameter during each control period t to generate a torque profile that is equivalent to the average torque in one embodiment. Alternatively, the modulated torque command may be a pulsewidth-modulated command that executes multiple cycles based upon the peak torque per loss parameter and the second torque parameter during each control period t to generate a torque profile that is equivalent to the average torque in one embodiment. Alternatively, the modulated torque command may be an arbitrarily-generated torque profile that is determined based upon the torque command and system losses that minimizes system losses over the span of the control period t and is determined based upon the peak torque per loss parameter and the second torque parameter. Corresponding dq currents 706 are shown, including modulated d-axis current 707 and modulated q-axis current 708, as determined by step (218) of FIG. 2.

The overall goal of this operation is to have energy loss that reduces electrical energy consumption without compromising operation in response to maximum commanded torque output such as a wide-open throttle event, such that peak torque is unchanged. The combination of controlling the electric machine 110 at the peak torque per loss parameter using the modulated torque command and relying upon fast response time of the electric machine 110 facilitates modulation of the dq axis current to reduce partial load losses by operating at peak efficiency levels.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

The invention claimed is:

1. A control system for a multi-phase rotary electric machine, comprising:
   an inverter, electrically connected to the electric machine; and
   a controller, operatively coupled to the inverter and in communication with sensors that are disposed to monitor the electric machine, the controller including an instruction set, the instruction set executable to:
     determine a torque command and a rotational speed of the electric machine;
     determine a peak torque per loss parameter for the electric machine based upon the rotational speed of the electric machine;
     determine a second torque parameter for the electric machine based upon the rotational speed of the electric machine;
     determine a modulated torque command for controlling the electric machine based upon the peak torque per loss parameter and the second torque parameter, wherein the electric machine generates an average torque that is equivalent to the torque command when operating in response to the modulated torque command; and
     control the inverter to operate the electric machine based upon the modulated torque command.

2. The control system of claim 1, further comprising the instruction set executable to:
   determine an electrical time constant associated with the electric machine; and
   control the inverter to operate the electric machine based upon the modulated torque command and the electrical time constant.

3. The control system of claim 2, further comprising the instruction set executable to:
   determine a control period for the electric machine based upon the time constant; and
   control the inverter to operate the electric machine based upon the modulated torque command and the control period.

4. The control system of claim 1, wherein the instruction set executable to determine the modulated torque command further comprises the instruction set executable to:
   determine a control period for the electric machine based upon an electrical time constant associated with the electric machine;
   determine a first subperiod of the control period for controlling the electric machine at the peak torque per loss parameter and determine a second subperiod of the control period for controlling the electric machine at the second torque parameter, wherein the average torque generated by the electric machine over the control period is equivalent to the torque command; and
   control the inverter to operate the electric machine at the peak torque per loss parameter for the first subperiod, and control the inverter to operate the electric machine at the second torque parameter for the second subperiod.

5. The control system of claim 4, wherein the instruction set executable to control the inverter to operate the electric machine at the peak torque per loss parameter for the first subperiod and operate the electric machine at the second torque parameter for the second subperiod comprises the instruction set executable to repetitively control the inverter to operate the electric machine at the peak torque per loss parameter for the first subperiod and operate the electric machine at the second torque parameter for the second subperiod.

6. The control system of claim 1, wherein the peak torque per loss parameter comprises a torque level associated with peak efficiency of the electric machine at the rotational speed of the electric machine.

7. The control system of claim 1, wherein the second torque parameter comprises a magnitude of torque associated with a minimum power loss at the rotational speed of the electric machine.

8. The control system of claim 7, wherein the second torque parameter for the electric machine is zero.

9. The control system of claim 1, wherein the sensors that are disposed to monitor the electric machine comprise current, voltage and speed sensors that are disposed to monitor the electric machine.

10. The control system of claim 1, wherein the torque command of the electric machine comprises a partial load torque command.

11. A method for controlling a multi-phase rotary electric machine coupled to an actuator, the method comprising:
  determining a torque command and a rotational speed of the electric machine;
  determining an electrical time constant associated with the electric machine;
  determining a peak torque per loss parameter for the electric machine at the rotational speed of the electric machine;
  determining a second torque parameter for the electric machine at the rotational speed of the electric machine;
  determining a control period based upon the electrical time constant for the electric machine;
  determining a first subperiod for controlling the electric machine at the peak torque per loss parameter and a second subperiod for controlling the electric machine at the second torque parameter, wherein the control period is equivalent to a sum of the first and second subperiods, and wherein an average torque generated by the electric machine over the control period is equivalent to the torque command; and
  controlling the electric machine to generate torque transferable to the actuator responsive to the peak torque per loss parameter for the first subperiod and controlling the electric machine to generate torque transferable to the actuator responsive to the second torque parameter for the second subperiod during the control period.

12. The method of claim 11, further comprising:
  controlling the inverter to operate the electric machine at the peak torque per loss parameter for the first subperiod, and controlling the inverter to operate the electric machine at the second torque parameter for the second subperiod.

13. A control system for a multi-phase rotary electric machine, comprising:
  an inverter, electrically connected to the electric machine; and
  a controller, operatively coupled to the inverter and in communication with sensors that are disposed to monitor the electric machine, the controller including an instruction set, the instruction set executable to:
    determine a torque command and a rotational speed of the electric machine;
    determine a peak torque per loss parameter for the electric machine based upon the rotational speed of the electric machine;
    determine a second torque parameter for the electric machine associated with a minimum power loss at the rotational speed of the electric machine;
    determine a modulated torque command for controlling the electric machine based upon the peak torque per loss parameter and the second torque parameter, wherein the modulated torque command includes an arbitrarily-generated torque profile that is determined based upon the torque command and minimizes system losses based upon the peak torque per loss parameter and the second torque parameter; and
    control the inverter to operate the electric machine based upon the modulated torque command and the torque profile.

14. The control system of claim 13, wherein the peak torque per loss parameter comprises a torque level associated with peak efficiency of the electric machine at the rotational speed of the electric machine.

15. The control system of claim 13, wherein the second torque parameter comprises a magnitude of torque associated with a minimum power loss at the rotational speed of the electric machine.

16. The control system of claim 15, wherein the second torque parameter for the electric machine is zero.

17. The control system of claim 13, wherein the sensors that are disposed to monitor the electric machine comprise current, voltage and speed sensors that are disposed to monitor the electric machine.

18. The control system of claim 13, wherein the torque command of the electric machine comprises a partial load torque command.

19. The control system of claim 13, wherein the instruction set executable to control the inverter to operate the electric machine based upon the modulated torque command and the torque profile comprises the instruction set executable to repetitively control the inverter to operate the electric machine at the peak torque per loss parameter for a first subperiod and operate the electric machine at the second torque parameter for a second subperiod, wherein the first and second subperiods are determined based upon an electrical time constant for the electric machine.

* * * * *